United States Patent [19]

Foster, Jr.

[11] Patent Number: 4,827,104

[45] Date of Patent: May 2, 1989

[54] PHOTOTRANSISTOR RELAY ELECTRONIC TEMPERATURE CONTROL FOR CORDLESS IRONS

[75] Inventor: Robert W. Foster, Jr., Darien, Ill.

[73] Assignee: Dart Industries Inc., Deerfield, Ill.

[21] Appl. No.: 919,393

[22] Filed: Oct. 16, 1986

[51] Int. Cl.[4] ............................................ D06F 75/26
[52] U.S. Cl. .................................. 219/251; 219/246; 374/132
[58] Field of Search ............... 219/251, 252, 246, 247, 219/518, 502, 519, 491, 494; 374/121, 132

[56] References Cited

U.S. PATENT DOCUMENTS

| | | | |
|---|---|---|---|
| 3,760,149 | 9/1973 | Harsanyi | 219/247 |
| 3,781,504 | 12/1973 | Harnden, Jr. | 219/502 X |
| 3,968,489 | 7/1976 | Richards et al. | 219/502 X |
| 4,278,870 | 7/1981 | Carleton et al. | 219/518 X |
| 4,322,900 | 4/1982 | Hacker et al. | 219/252 X |
| 4,347,428 | 8/1982 | Conrad et al. | 219/251 |
| 4,418,268 | 11/1983 | Munshaw | 219/247 X |
| 4,492,840 | 1/1985 | Lex | 219/518 X |
| 4,580,038 | 4/1986 | O'Loughlin | 219/252 X |
| 4,617,441 | 10/1986 | Koide et al. | 219/502 X |

FOREIGN PATENT DOCUMENTS 918361  4/1982  U.S.S.R. ............................. 219/251

Primary Examiner—A. D. Pellinen
Assistant Examiner—A. Jonathan Wysocki
Attorney, Agent, or Firm—Russell L. McIlwain

[57] ABSTRACT

An electronic temperature control for a cordless ironing apparatus. The temperature of the sole plate of the iron is sensed by a thermistor embedded therein; the thermistor is part of an astable multivibrator circuit, and any change in temperature of the sole plate causes a change in resistance of the thermistor, and a corresponding change in frequency at the output of the multivibrator. This output drives an infrared LED, and the light emitted by the LED in the iron is sensed by a phototransistor in the base, which relays the sensed temperature information to a microprocessor therein which controls the current applied to the heating element accordingly, to maintain the desired temperature of the sole plate.

16 Claims, 4 Drawing Sheets

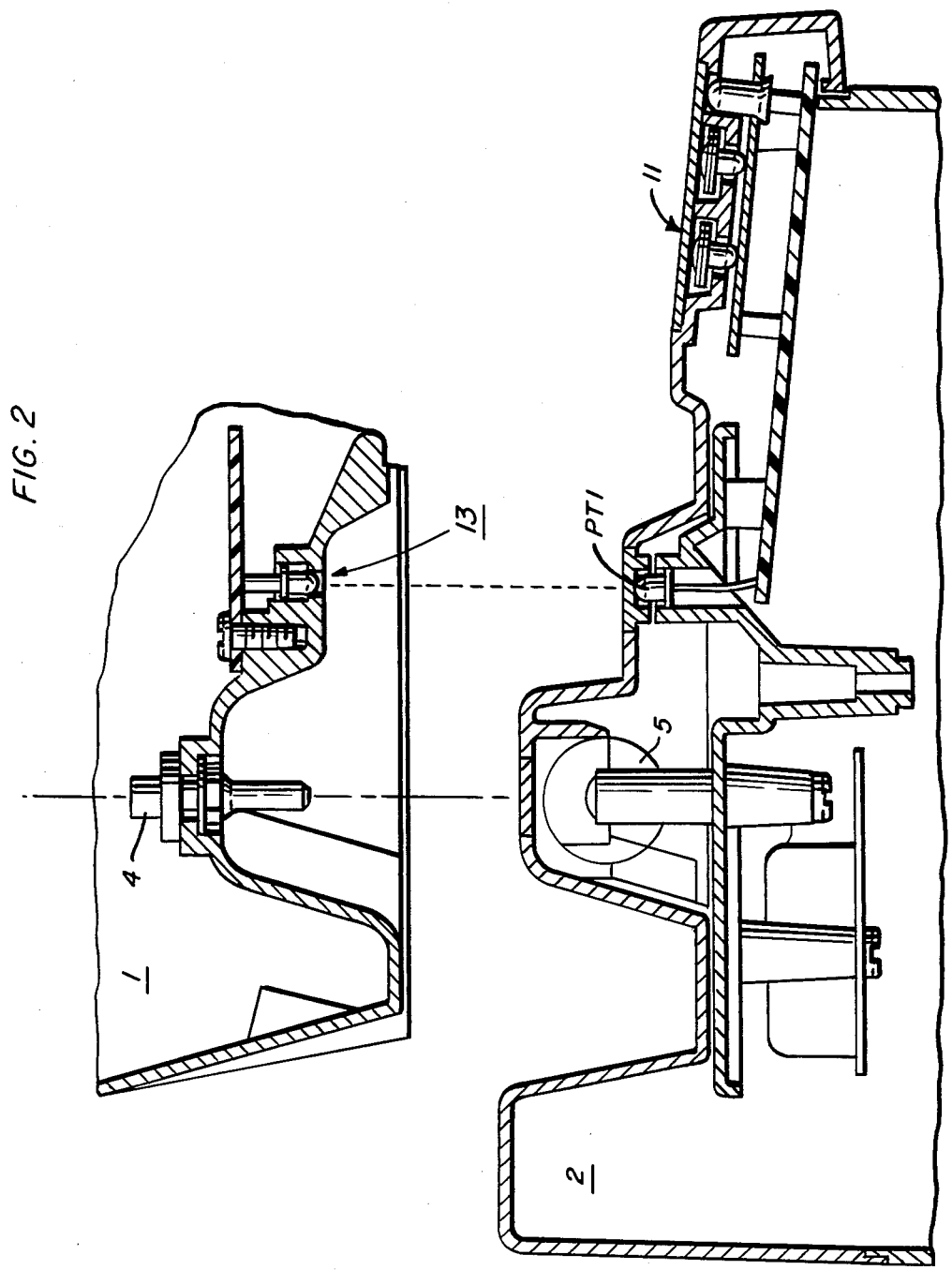

PHOTOTRANSISTOR RELAY ELECTRONIC TEMPERATURE CONTROL FOR CORDLESS IRONS

BACKGROUND OF THE INVENTION

1. Field of the Invention

This invention relates to temperature controls for electric irons, and more particularly to electronic temperature control means for cordless electric irons.

2. Description of the Prior Art

One of the most common of present day household appliances is the electric iron. While the modern electric iron, with variable temperature control, steam and spray features has much to recommend it over the old sadirons resting on a pot belly stove to be heated, there is one disadvantage of today's iron over the sadiron—the cord. No matter how one tries to work around it, it seems the iron's cord is always in the way. Recognizing this disadvantage, manufacturers have recently begun producing cordless electric irons, providing all of the conveniences of other modern irons without the inconvenience of the cord. Examples of these irons include U.S. Pat. No. 3,760,149 to Harsanyi, patented Sept. 18, 1973, and U.S. Pat. No. 4,528,429 to Dobson et al, patented July 9, 1985, and assigned to the same assignee as this invention.

In both of these prior art devices, the temperature of the sole plate is controlled by a mechanical adjustable thermostat mounted on the iron. While this manner of temperature control may be adequate for most uses, it is far from current state-of-the-art electronic temperature control means currently in use in a variety of consumer products.

SUMMARY OF THE INVENTION

This invention provides an accurate electronic temperature control means for cordless electric irons, with the temperature sensor being embedded in the sole plate of the iron, and the control means mounted in the base member, with the temperature sensor and the control means communicating by light wave communications whenever the iron is placed in operative connection with the base member.

Eliminating the control means from the iron member allows it to be more compact and lighter, and also allows the use of accurate, electronic temperature control circuitry mounted in the base to provide improved control and ease of operation of the cordless iron.

Other advantages include push button selection of the desired temperature, visual indications of the current status of the iron and its programmed temperature, audible indications of its operative functions, and automatic shut-off in case of various undesirable operating conditions.

BRIEF DESCRIPTION OF THE DRAWINGS

FIG. 2 is a sectional view of the iron mounted in operational connection with the base member of the subject invention.

DESCRIPTION OF THE PREFERRED EMBODIMENT

Figure 1:
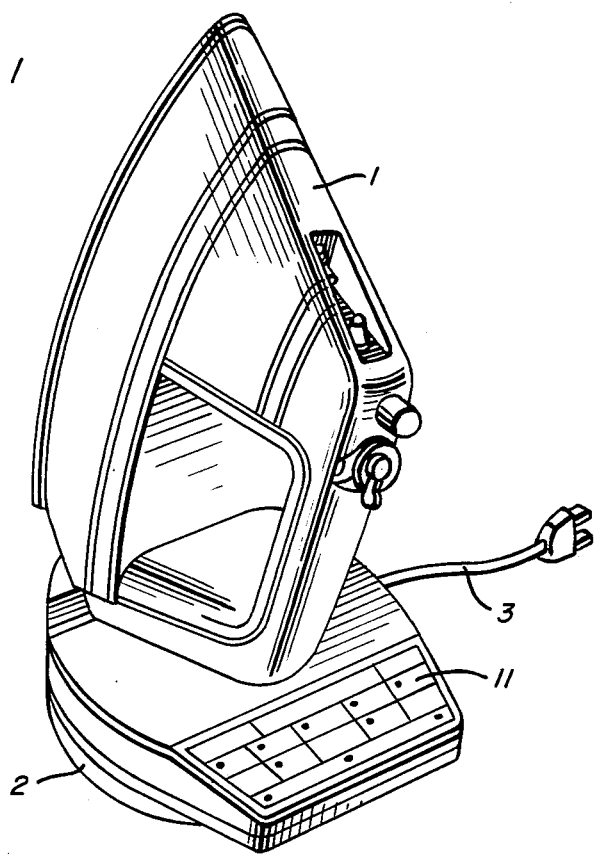
FIG. 1 is a pictorial view of a cordless iron incorporating the electronic temperature control of the subject invention.

A pictorial view of the end product of this invention is illustrated in FIG. 1. Shown is a cordless electric iron 1 resting upon its base member 2. The base member 2 is connected by cord 3 to a source of alternating current (not shown), and houses the electronic control means for controlling and maintaining the temperature of the sole plate of iron 1. This control means is accessed through key switch assembly 11 for choosing a desired operating temperature for iron 1.

FIG. 2 shows the operative interconnection between the iron 1 and base member 2. Included are the male connector pins 4 on the iron and corresponding female connector 5 on the base for providing alternating current to the heating element of iron 1 whenever it is placed in base member 2. Also shown are the infrared light emitting diode 13 and associated base-mounted phototransistor PT1 of the communication system between the iron temperature sensor and the electronic control means in the base 2.

Figure 3:
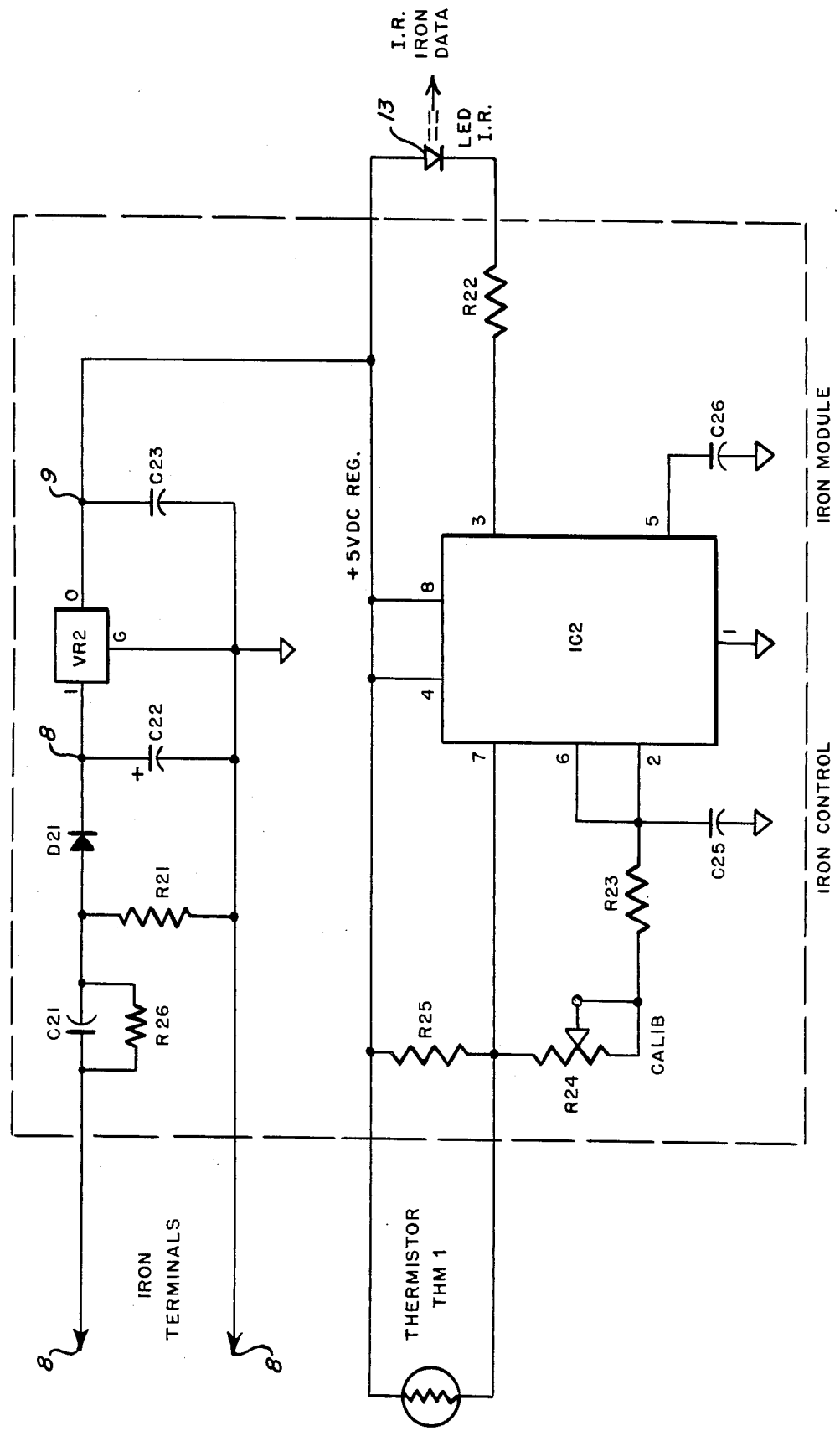
FIG. 3 is a schematic representation of the temperature sensing circuitry contained within the iron of the subject invention.

The schematic drawing of FIG. 3 is representative of the temperature sensing circuitry contained within iron 1. Terminals 7 are connected through the iron heating element (not shown) to male connector pins 4, which in turn are connected through the electronic control means to be described later to a source of alternating line current. This 120 volt line current is processed by capacitive reactance voltage divider C21, R26 and R21 to supply a reduced voltage to rectifier diode D21 and filter C22 such that an unregulated DC voltage of 12 to 16 volts appears at node 8.

This unregulated voltage is applied to integrated circuit voltage regulator VR2 and associated bypass capacitor C23 to provide a 5 volt DC regulated source at node 9, which source is used to power the temperature sensing circuitry mounted in the iron 1.

The temperature sensing circuitry consists of integrated circuit oscillator IC2, which performs as an astable multivibrator when connected as shown in FIG. 3. The sole plate temperature sensor is thermistor THM1, which, in combination with resistors R23 and R25 trimming potentiometer R24 and capacitor C25, provides the frequency determining network for astable multivibrator IC2. IC2 produces a nonlinear output pulse frequency which is inversely proportional to the resistance of thermistor THM1, and therefore proportional to the temperature of the sole plate of the iron. This pulse output drives infrared light-emitting diode 13 through current limiting resistor R22 such that the signal representing the temperature of the sole plate can be transmitted to the base-mounted electronic temperature control means.

Figure 4:
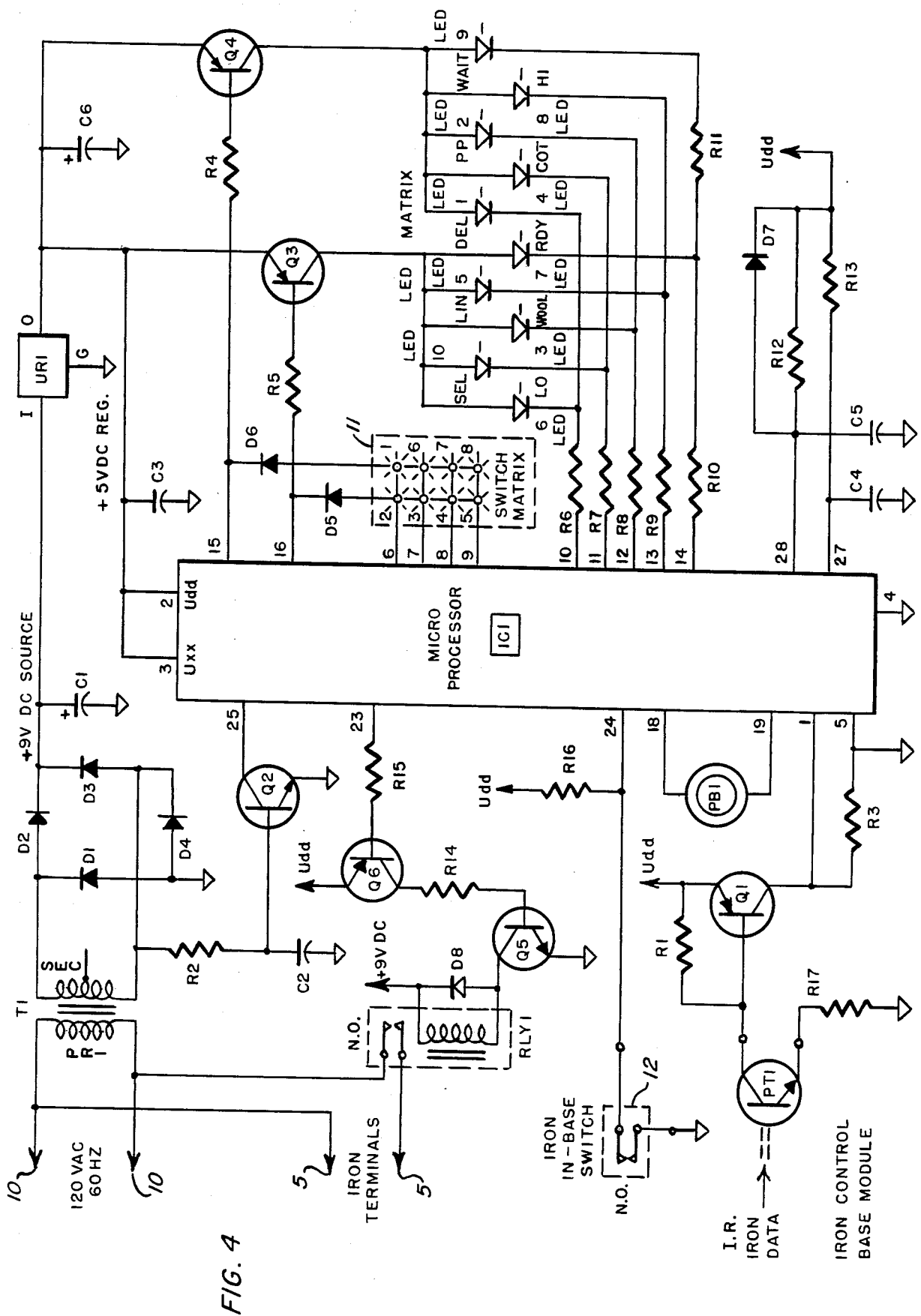
FIG. 4 is a schematic representation of the base-mounted electronic control circuitry.

The base circuitry will now be described with reference to FIG. 4. The base member is connected to a source of alternating line current through a power cord (not shown) connected to terminals 10. The alternating current is also connected directly to female connector terminals 5, to which the iron 1 is connected whenever it is placed on the base 2. This applied line current is reduced in voltage by transformer T1 and passed through full wave rectifier D1, D2, D3, D4. The resulting unregulated DC voltage of approximately nine volts is filtered by capacitor C1 and applied to the input of integrated circuit voltage regulator VR1, which provides a regulated output of 5 volts DC, which is used to power microprocessor IC1 and the remainder of the base circuitry.

Also connected to the secondary winding of transformer T1 is timing network R2, C2, Q2 which provides a 60 Hz. pulse signal for use as a time base for microprocessor IC1 for measuring of the frequency of the signal received from the iron-mounted temperature sensing circuitry.

Switch matrix 11 provides user input to microprocessor IC1 for selection of the desired temperature programming function. Diodes D5 and D6 serve to isolate the switching function from the light-emitting diode drives.

Resistors R4 through R11, transistors Q3 and Q4, and light-emitting diodes LED 1 through LED 10 provide visual indications of temperature selection and circuit status in accordance with the functions selected through microprocessor IC1 through switch matrix 11.

The resistance-capacitance network formed by R13 and C4 is the frequency-determining circuit for the instruction cycle oscillator of microprocessor IC1.

Resistor R12, diode D7 and capcitor C5 provide a power-up signal to microprocessor IC1 to reset it to its first instruction after a predetermined delay from turn-on. Diode D7 prevents low voltage reset during operation.

An audible indication is provided to the user upon execution of certain functions by microprocessor IC1, such as automatic turn-off, through application of a frequency pulse to piezoelectric buzzer PB1.

Iron in-base switch 12 is included to signal microprocessor IC1 whether or not the iron is in operational connection with the base. Switching current is provided by resistor R16.

The iron temperature frequency signal emitted by infrared LED 13 is received in the base by phototransistor PT1. The received signal is amplified and squared by the network of transistor Q1 and resistors R1 and R3 to provide a suitable signal to microprocessor IC1. The microprocessor measures the frequency of the received signal, which is proportional to the temperature of the sole plate, and makes control decisions based upon its programming and key switch inputs provided by the user. Resistor R17 prevents destruction of transistor Q1 if phototransistor PT1 should saturate.

Microprocessor IC1 outputs its control decisions through the network of resistors R14 and R15 and transistors Q5 and Q6, which drive power relay RLY1 for providing line current through female connector 5 to the iron heating element. Diode D8 protects the winding of relay RLY1 from negative spikes. Capacitor C6 provides current capacity during relay pull-in, and C3 provides bypassing.

Figure 5:
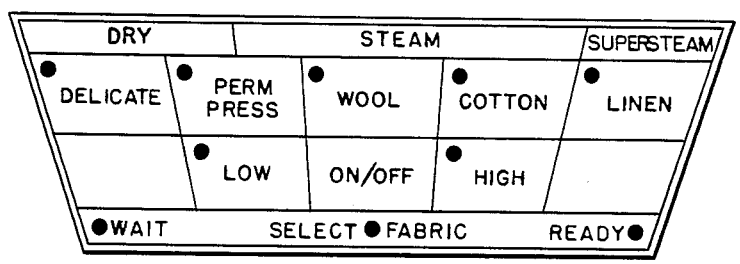
FIG. 5 is a plan view of the key switch assembly and indicator lamps of the electronic temperature control means of the invention.

FIG. 5 shows the display panel which is applied over key switch assembly 11. Illustrated are labels for the various temperatures which may be selected: DELICATE, PERM. PRESS, WOOL, COTTON and LINEN; intermediate temperatures LOW and HIGH for each standard setting; the ON/OFF switch; and indicator LED's for the selected temperature and the status of the iron electronic control circuitry (WAIT, READY).

The general operation of the microprocessor-controlled cordless electric iron wil be described next, followed by a more detailed description of the functional operational of the various operative states of the control circuitry.

First, the base member 2 is plugged into a source of line current and the iron 1 is placed in operative connection with the base. Pressing the ON button generates a single beep and the SELECT FABRIC indicator will begin to flash. No power is applied to the iron until a fabric temperature setting has been selected. If no fabric setting is chosen within ten minutes after pressing the ON button, the control means will go into an automatic shut-off mode.

A temperature may be selected by pressing one of the five fabric settings and optional HIGH or LOW buttons for intermediate temperatures. As these settings are selected, the associated LED indicators will light, and a beep will be generated for each switch pressed. Once a fabric setting is selected, the SELECT FABRIC indicator will go out, and the WAIT indicator will come on continuously until the temperature of the iron as measured by thermistor THM1 and its associated circuitry reaches the selected setting, at which point the WAIT indicator will be extinguished, and the READY indicator will light, accompanied by two beeps. When the iron is removed from the base, the fabric (temperature) indicators will remain lit, but both the WAIT and READY indicators will extinguish until the iron is replaced on the base.

If the iron is replaced on the base, and the temperature of the iron is outside the selected range, the WAIT indicator will come on, accompanied by a single beep. Power is applied to the iron only after the presence of the iron is sensed in the base, and the temperature control circuitry determines that the present iron temperature is out of range.

If the iron is left on the base for more than ten minutes without being removed, and the temperature setting is not changed, ten beeps will sound. If nothing is done within another two minutes, the iron will go into automatic shutdown. When this happens, the power to the iron is disconnected and the temperature display is turned off. The WAIT indicator will come on until the iron has cooled enough to be stored, at which time the WAIT light is extinguished and a single beep is generated. The temperature control and display can be re-activated using normal start-up procedures.

Turning off the iron using the ON/OFF switch causes the WAIT indicator to come on until the iron has cooled enough to be stored, at which time the WAIT indicator goes out, and a single beep is generated.

The following paragraphs describe the functional operation of the various operative states of the electronic cordless iron in detail.

OFF STATE:

When the iron is in the off state, the power relay is off, all LED's are off, and all switches are disabled except for the ON/OFF switch. If the iron is not in the base, the "off base" state is entered. If the ON/OFF switch is pressed while in the off state, and the iron is in the base, a beep is generated and the SELECT FABRIC mode is entered. If the ON/OFF switch is pressed while in the off state, and the iron is not in the base, a beep is sounded, but the SELECT FABRIC mode is not entered.

SELECT FABRIC STATE:

When the iron control means is in the SELECT FABRIC state, the power relay is off, all LED's are off, except for the SELECT FABRIC LED which is flashing, and the keybaord switches are enabled if the iron is in the base. If the iron is not in the base, the "off base" state is entered. If the ON/OFF switch is pressed, a beep is heard, and the "off" state is entered. If one of the fabric select switches is pressed, and the iron is in the base, a beep is generated, the LED associated with the switch pressed is turned on, and the "wait" state is entered. If no switches are pressed for ten minutes, the "automatic shuf-off" state is entered. If no infrared signal indicative of the temperature being measured at the sole plate is received, or the infrared signal is not increasing in frequency, the iron shuts off immediately.

WAIT STATE:

When the iron control is in the "wait" state, the power relay can be on or off, depending upon the requirements of the heating element, the selected fabric LED is on, the WAIT LED is on, all other LED's are off, and all eight keyboard switches are enabled. If the iron is removed from the base, the "off base" state is entered. In the "wait" state, the control means is monitoring the heating or cooling of the iron to determine when the selected temperature range has been reached. When the selected temperature is reached, two beeps are generated, and the "ready" state is entered. While waiting for the iron to reach the selected temperature, the control is monitoring the keyboard. If the ON/OFF switch is pressed, a beep is heard, and the "off" state is entered. If the HIGH or LOW switch is pushed, a beep is generated, and the associated LED is turned on if it was previously off (indicating that a new temperature range has been selected), or if it was on, it is left on. If the currently selected fabric switch is pressed (LED is already on), a beep is generated, the HIGH or LOW LED's are turned off, and if either the HIGH or LOW LED was on, a new temperature range is set as the selected temperature. If a new fabric switch is pushed, a beep is generated, the HIGH and LOW LED's are turned off, the newly selected fabric LED is turned on, and a new temperature range is set as the selected temperature. If a new temperature is selected, a two-second timeout is set. The iron cannot reach the "ready" state until this two-second timeout has expired, even if the selected temperature is achieved beforehand.

READY STATE:

When the control is in the "ready" state, the power relay may be on or off as needed to maintain the selected temperature, the selected fabric LED is on, the HIGH or LOW LED may be on, the READY LED is on, all other LED's are off, and all eight keyboard switches are in enabled. If the iron is removed from the base, the "off base" state is entered. If the "ready" state, the control is monitoring the heating or cooling of the iron to determine if the temperature is outside the selected temperature range. When the temperature is outside of the selected temperature range, the power relay is on to maintain the selected temperature setting. The READY LED strays on during this maintenance cycle. If, during an "off base" state, the iron cools too far to be functional when the iron is replaced on the base, the "wait" state is entered, and a single beep is generated. While waiting for the iron to be removed from the base, the control is monitoring keyboard. If no keys are pressed, or the iron is not removed for ten minutes, the "automatic shut-off" state is entered. If the ON/OFF switch is pressed, a beep is heard, and the "off" state is entered. If the HIGH or LOW switch is pressed, a beep is heard, and the associated LED is turned on if it was turned off, indicating that a new temperature range has been selected, and if it was on, it is left on. If the currently selected fabric switch is pressed, a beep is heard, the HIGH or LOW LED's are turned off, and if either the HIGH or LOW LED was on, a new temperature range is set as the selected temperature, and the "wait" state is entered. If a new fabric switch is pushed, a beep is heard, the HIGH and LOW LED's are turned off, the newly selected fabric LED is turned on, a new temperature range is set as the selected temperature, and the "wait" state is entered. If a new temperature is selected, a two-second timeout is set before entering the "ready" state.

OFF BASE STATE:

When the control is in the "off base" state, the power relay is off, the selected fabric LED is on, the HIGH or LOW LED may be on, all other LED's are off, and all keyboard switches are disabled except the ON/OFF switch. The control remains in the "off base" state until the iron is returned to the base. When the iron is replaced in the base, the state that the module was in just before the iron was removed from the base is reentered. If the iron is not replaced in the base, and the ON/OFF switch is not pressed for ten minutes, the "automatic shut-off" state is entered. If the ON/OFF switch is pressed, a beep is heard, and the "off" state is entered.

AUTOMATIC SHUT-OFF STATE:

When the control enters the "automatic shut-off" state, ten beeps are generated, and a two-minute timeout is started. If no keys are pressed or the iron is not removed from the base within the two-minute timeout, then the "off" state is entered. If the current fabric key is pressed, or the iron is removed and replaced during this two-minute timeout, then the state that the module was in just before the automatic shut-off state was entered is reentered. If a different fabric key is pressed, the control enters the "wait" state. If the iron is removed and not replaced during this two-minute timeout, the "off base" state is entered. If the ON/OFF key is pressed, the control enters the "off" state. Temperature is maintained during this two-minute period.

Operation of the preferred embodiment of the electronic temperature control means of the invention will now be described with reference to FIGS. 3 and 4. Once the iron has been turned on and a temperature has been selected, power is supplied through power relay RLY1, through connector terminal pairs 5 and 4 to the heating element of the iron, and to terminals 8 of the electronic temperature sensing circuitry.

The resistance of thermistor THM1 varies inversely proportionally in accordance with the temperature of the iron sole plate in which it is embedded. That resistance, in combination with resistors R23, R24 and R25, and capacitor C25, forms a frequency determining network for astable multivibrator IC2. The output frequency thus generated by multivibrator IC2 is also proportional to the temperature of the sole plate, and this frequency drives infrared LED 13 through current-limiting resistor R22.

This circuit functions only when the iron is operatively connected to the base, since the iron contains no source of power once it is removed from the base. As can be seen in FIG. 2, whenever the iron is placed in the base, LED 13 is positioned directly above phototransistor PT1. Thus, the variable frequency signals representing sole plate temperature being transmitted by LED 13 are received directly by phototransistor PT1, processed by amplifying and squaring network R1, Q1, R3 and applied to the microprocessor control means IC1. The microprocessor is programmed to translate the received frequency into a control signal by measuring the frequency against the 60 Hz. time base generated by R1, C2 and Q2. The microprocessor IC1 then compares the measured temperature of the sole plate with the selected temperature from key switch assembly 11, and controls relay driver R15, Q6, R14 and Q5 and power relay RLY1 to establish and maintain the selected temperature for as long as the iron is in operation.

While this preferred embodiment of the invention has been described utilizing a radiant energy communication link between the iron and the base, it is to be understood that other means for transmitting the variable frequency of the temperature sensing circuitry to the control means can be employed within the scope of the invention. Such other means might include audio transmission with piezoelectric transducers, inductive transmission using eelctromagnetic coils, or capacitive transducers.

I claim:

1. In a cordless electric ironing apparatus including:
a base member connected to a source of alternating line current, a separable iron member supported on said base member in a predetermined position, said iron member electrically coupled to said source of alternating line current when placed on said base member in said predetermined position, and control means in said base member for adjusting and maintaining the temperature of said iron member supported therein, said iron member comprised of a sole plate, a heating element, a temperature sensor for said heating element, and an insulated handle to allow manipulation of said iron while in a heated state;
the improvement comprising multivibrator means in said iron member for transmitting a signal indicative of the temperature of said sole plate as measured by said temperature sensor from said iron member to said control means in said base member such that the desired temperature of said heating element and associated sole plate may be adjusted and maintained whenever said iron member is placed in said predetermined position on said base member.

2. The transmitting means of claim 1, wherein said temperature sensor is thermistor.

3. The transmitting means of claim 1, wherein said signal indicative of the temperature of said sole plate is generated by an astable multivibrator associated with said temperature sensor.

4. The transmitting means of claim 1, wherein said control means is a microprocessor.

5. The transmitting means of claim 1, wherein said signal indicative of the temperature of said sole plate is an infrared signal.

6. In a cordless electric ironing apparatus, including:
a base member connected to a source of alternating line current, and a microprocessor control means in said base member for adjusting and maintaining the temperature of an iron member associated therewith, said iron member comprised of a sole plate, a heating element, a temperature sensor embedded in said sole plate, and an insulated handle for manual manipulation of said iron member while in a heated state,
the improvement comprising multivibrator means in said iron member for transmitting a variable frequency infrared signal indicative of the temperature of said sole plate from said iron member; and
communication means associated with said base member and said iron member for communicating said signal to said microprocessor control means in said base member such that the desired temperature of said heating element and said sole plate may be adjusted and maintained whenever said iron member is placed in operative connection with said base member.

7. The transmitting means of claim 1, wherein the signal indicative of the temperature of said sole plate as measured by said temperature sensor is comprised of radiant energy.

8. The transmitting means of claim 5, wherein the frequency of said infrared signal is varied by the combination of said temperature sensor and an astable multivibrator circuit associated therewith.

9. The transmitting means of claim 5, wherein said temperature sensor is a thermistor.

10. A cordless electric iron comprising:
an iron member having an electrically heated sole,
a first set of terminals in circuit with the heating unit of said sole and mounted on said iron member,
a temperature responsive element for sensing the temperature of said sole,
multivibrator means in circuit with said temperature responsive element and positioned in said iron member for generating a signal proportional to said sensed temperature and coupling said signal to an output transducer means mounted on said iron member,
a base member for supporting said iron member in a predetermined position, said base member having a second set of terminals connectable to a source of alternating line current and being engageable with said first set of terminals in said predetermined position,
control means in said base member for adjusting and maintaining the temperature of said sole by controlling said source of alternating line current,
an input transducer means mounted on said base member in confronting relationship with said output transducer means when said base member and said iron member are in said predetermined position for transmitting said signal between said base member and said iron member, and
circuit means for connecting said input transducer to said control means.

11. The combination as defined in claim 10, wherein said temperature responsive element is a thermistor.

12. The combination as defined in claim 11, wherein said means in circuit with said thermistor for generating a signal proportional to said sensed temperature is an astable multivibrator.

13. The combination as defined in claim 12, wherein said output transducer means is an infrared light emitting diode.

14. The combination as defined in claim 13, wherein said input transducer means is a phototransistor.

15. The combination as defined in claim 10, wherein said control means in said base member comprises a microprocessor.

16. The combination as defined in claim 16, including a switch matrix mounted on said base member for providing user input to said microprocessor.

* * * * *